United States Patent [19]
Peddinghaus

[11] 3,750,855
[45] Aug. 7, 1973

[54] HYDRO-PNEUMATIC PISTON AND CYLINDER DAMPING DEVICE

[76] Inventor: Carl Ullrich Peddinghaus, Obere Lichtenplatzer Strasse 276, 56 Wuppertal-Barmen, Germany

[22] Filed: Dec. 2, 1971

[21] Appl. No.: 204,034

[30] Foreign Application Priority Data
Mar. 12, 1971 Germany.................. P 21 11 967.5

[52] U.S. Cl.................. 188/269, 188/314, 188/315
[51] Int. Cl............................................. F16f 9/06
[58] Field of Search.................... 188/314, 269, 315

[56] References Cited
UNITED STATES PATENTS
3,272,495 9/1966 Axthammer.................. 188/315 X
3,486,590 12/1969 Peddinghaus.................. 188/269

Primary Examiner—M. Henson Wood, Jr.
Assistant Examiner—John J. Love
Attorney—Holman & Stern

[57] ABSTRACT

A piston and cylinder damping device wherein the cylinder is provided with a compensating chamber for the fluid displaced by the piston rod, wherein the compensating chamber takes the form of a cartridge which contains a pressurised gas and which has at one end a sealing disc, the device being also provided with a punch which is arranged to pierce the sealing disc when in use the cartridge is assembled to the cylinder and the piston is first displaced by relative inward movement of the associated piston rod, piercing of the sealing disc then enabling the pressurised gas in the cartridge to be placed in communication with the fluid in the cylinder.

11 Claims, 5 Drawing Figures

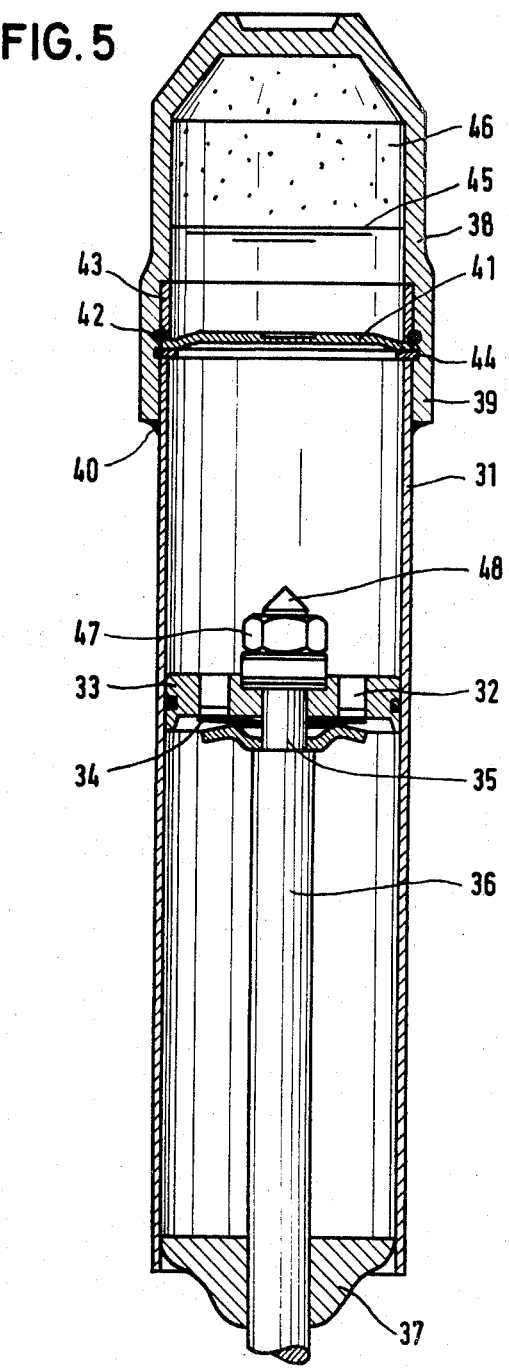

HYDRO-PNEUMATIC PISTON AND CYLINDER DAMPING DEVICE

BACKGROUND OF THE INVENTION

The invention relates to a hydro-pneumatic piston and cylinder damping device in which a damping piston secured on a piston rod can be displaced in a cylinder containing damping fluid, thus dividing the cylinder into two chambers of varying volume, and wherein there is a compensating chamber for the fluid displaced by the piston rod, said compensating chamber containing pressurised gas and being disposed on that side of the cylinder which is opposite to the piston rod.

PRIOR ART

In known dampers of this kind the pressurised gas has to be under considerable pressure in order to prevent the damping fluid from foaming during the movements of the piston so that considerable expenditure is required for effective sealing. There may be leakage losses of the pressurised gas and/or the damping fluid during long storage and transport periods. In addition special means are often necessary by which it must be guaranteed that the pressurised gas which does dissolve in the damping fluid during operation can be separated off efficiently into the compensating chamber, so that such gas does not remain in the damping fluid and in this way influence disadvantageously the damping piston. In addition in known embodiments of such devices the pressurised gas can only be inserted during the manufacturing process in the manufacturing works so that in the course of time dampers which have become useless because of escape of pressurised gas through the piston rod seal cannot be repaired again in simple repair workshops but must be replaced completely.

OBJECTS AND SUMMARY OF THE INVENTION

The object of the present invention is to provide an improved hydro-pneumatic damping device which can be stored or transported for any desired length of time without there being a danger of leakage losses, and in which in addition the possibility is created for repairs to be carried out without the whole damper having to be replaced, and also in which the operating efficiency is improved.

In accordance with the invention, there is provided a piston and cylinder damping device in which a damping piston secured on a piston rod can be displaced in a cylinder containing damping fluid so as to divide said cylinder into two chambers of varying volume, wherein the cylinder is provided with a compensating chamber for the fluid displaced by the piston rod, said compensating chamber containing pressurised gas, and being disposed in that end of the cylinder opposite to that through which the piston rod extends, characterised in that the compensating chamber is formed as a cartridge which has at one end a sealing disc, and in that there is provided in said device adjacent to the sealing disc a punch which is arranged to pierce said sealing disc when said piston is first displaced relatively to the cylinder by relative inward movement of said piston rod.

A damping device according to the invention and which is fully assembled can be stored and transported at will without there being any leakage losses since the damping fluid in the cylinder will not initially be under pressure because the pressurised gas (which is under about 30 to 40 atmospheres) is sealed completely in the cartridge. When the punch pierces the cartridge however when the damper is first put into operation this has a particularly advantageous effect because the pierced opening takes the shape of a nozzle and in this way an apertured baffle is formed through which pressurised gas which may be in the cylinder in operation can easily pass back into the cartridge. Since the edge of the pierced opening which projects into the inside of the cartridge is often torn unevenly the fluid flow passing through said opening becomes turbulent and can therefore if necessary give off any gas taken up more easily.

Moreover, the cartridge can be constructed so that it can be pushed into the cylinder or can be replaced by another cartridge in the cylinder during manufacture or for the purpose of repairs respectively. The cartridges filled with pressurised gas can be made relatively easily in mass production as does for example already happen with cartridges for gas-filled spray cans. Thus, the cartridge may be inserted in the cylinder which is closed at one end, said cartridge having an outside diameter which is smaller than the inside diameter of the cylinder.

Furthermore, in order to ensure that after the cartridge has been opened, even when the piston rod is extended as far as possible, no pressurised gas gets into the working chambers of the cylinder, the cartridge is conveniently filled partially with damping fluid as well as with the pressurised gas.

In a convenient embodiment of the invention one can also start with a tube which open at both ends for the cylinder and one can construct the cartridge with a larger diameter than the cylinder. One end of the cartridge is then provided with a counterbore which can be placed over the end of the cylinder opposite to the end through which the piston rod extends so that it is sealingly connected therewith.

The sealing disc conveniently has a central pierceable depression or area which may be relatively thin, the remainder of the disc being thicker and/or having radial stiffening ribs emanating from the centre so that the disc cannot be distorted except for the penetration. The punch provided to make the penetration may be conveniently formed at the end of or by an extension of the piston rod which is made into a point.

The invention is further illustrated with reference to the accompanyign drawings, wherein :

BRIEF DESCRIPTION OF THE DRAWING

FIG. 5 is a sectional side view showing yet a further embodiment of a damper constructed in accordance with the invention.

DETAILED DESCRIPTION OF THE INVENTION

Figure 1:
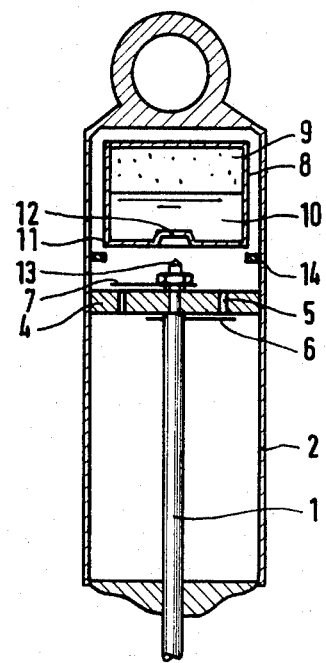
FIG. 1 is a schematic side view showing one example of a damper constructed in accordance with the invention and in which the piston rod of the damper is arranged to extend through the in situ lower end of the cylinder.

FIG. 1 shows schematically a hydro-pneumatic oscillation damper in which a piston rod 1 is arranged to extend through the bottom end of a cylinder 2 and said lower end of the cylinder 2 is for this purpose provided with a seal through which the piston rod 1 projects. On its upper end the piston rod 1 carries a damping piston 4 which is provided with valve ports 5. These valve ports are covered by valve discs 6 and 7 in such a way that in both directions of movement of the damping piston 4 there are varying flow resistances for the damping fluid.

In the upper part of the cylinder 2 there is disposed a cartridge 8 which is filled predominantly with pressurised gas 9 and partially with damping fluid 10. The surface of said cartridge 8 which faces towards the damping piston 4 has a centrally disposed pierceable depression 12 which is pierced by a punch 13 (formed at the end of the piston rod 1) when the damping piston 4 is pushed in completely for the first time and which then serves as a free opening for a permanent fluid connection between the damping fluid in the cartridge and that in the cylinder. In order to hold the cartridge 8 in its inserted position there is further provided in the side wall of the cylinder 2 a safety device 14 which is in the form of a securing ring.

Figure 2:
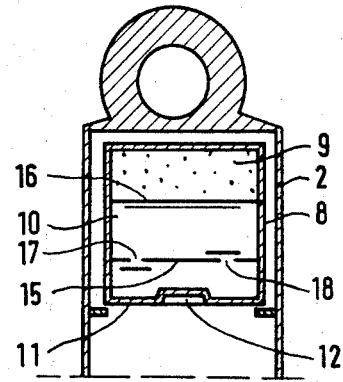
FIG. 2 is a partial side view of the upper end of a damper showing a variation of the construction seen in FIG. 1.

The embodiment shown in FIG. 2 differs from the one shown in FIG. 1 in that here the cartridge 8 is constructed with a valve plate 15. This valve plate lies at a level such that the level of the surface 16 of the damping fluid 10 is always higher. Moreover the valve plate 15 is provided with valves 17 and 18 which open in both flow directions and which have a greater resistance than the valves in the damping piston.

Figure 3:
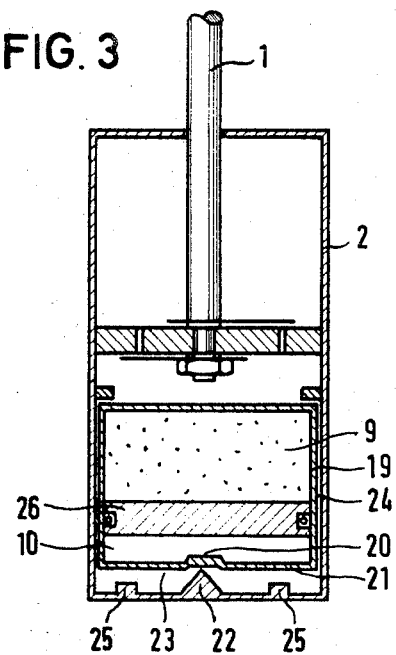
FIG. 3 is a schematic side view showing a further embodiment of the invention in which the piston rod extends through the in situ upper end of the cylinder.

In the embodiment shown in FIG. 3, the piston rod 1 is arranged to extend upwardly through the upper end of the cylidner 2. In this case there is a cartridge 19 which is provided with a pierceable depression 20 which is centrally disposed in the surface 21 and there is also a punch 22 on the interior of the cylinder end face 23 which is arranged to co-act with this depression 20. When the piston rod 1 and with it the damping piston 6 are pushed in for the first time at high velocity the cartridge 19 will move downwards as a result of the energy of fluid flow acting on it and the punch 22 will then open the cartridge at depression 20. In this embodiment it is in addition essential that a space 24 be formed between the outer walling of the cartridge 19 and the inner walling of the cylinder 2, in such a way that the damping fluid can flow round the cartridge in order to be able to pass through the opening formed at the depression 20. The surface 21 of the cartridge is additionally at the same time conveniently kept at a distance from the adjacent end surface of the cylinder by means of projections 25 connected to said end surface of the cylinder. The cartridge in this embodiment is also provided with a dividing piston 26 which completely separates the damping fluid 10 from the pressurised gas 9 so that no gas can be absorbed into the damping fluid.

Figure 4:
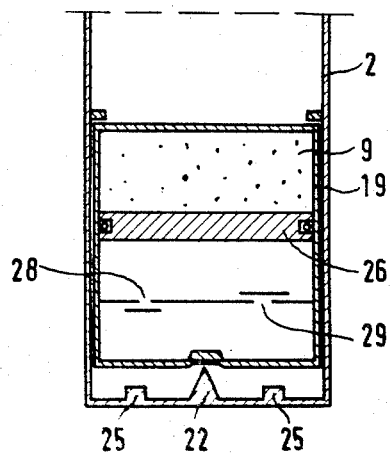
FIG. 4 is a partial side view of the lower end of a damper showing a variation of the construction seen in FIG. 3.

In the embodiment shown in FIG. 4, there is, in the cartridge 19 in addition to the piston 26, a valve plate 27 having valves 28 and 29 corresponding to those described in FIG. 2.

In the embodiment shown in FIG. 5, there is a piston 33 which is provided with valve ports 32 and which is guided in a cylinder 31. The valve ports 32 can in addition be partially covered by spring discs 34 in order to provide a differentiated damping during insertion and withdrawal of said piston. The piston 32 is disposed on the shouldered end 35 of a piston rod 36, said rod being guided out at the bottom end of the cylinder 31 through a seal 37 which is only shown schematically.

The upper part of the cylinder 31 is first of all left open during assembly. The cartridge 38 which has a counter-bore in its lower part 39 having a larger diameter than the cylinder 31 is then placed on said upper section of the cylinder. The lower edge of said cartridge is connected firmly and sealingly with the cylinder by a welded seam 40. In the lower part 39 of the cartridge 38 there is further disposed a sealing disc 41 which lies on a ring seal 42, which is in turn supported on the end of a collar 43 which is inserted in the counter-bore of the part 39. The sealing disc 41 is secured against movement in an axial direction towards the piston 33 by means of a circlip 44. In its central area the sealing disc 41 is relatively thin whereas in the area around this it is thicker and can conveniently have radial stiffeners. The cylinder 31 is moreover filled completely with damping fluid whereas the cartridge 38 contains damping fluid as far as the level 45. In addition the inside of the cartridge 38 contains the pressurised gas filling 46.

There is also a nut 47 which is screwed on to the shouldered end 35 of the piston rod 36 to secure the piston 33. Beyond this said shouldered end 35 is further extended and forms a central punch 48. With this punch the central area of the sealing disc 41 is penetrated when the piston 33 moves inwardly so that the punched hole in the disc 41 becomes nozzle shaped. Following this operation which is carried out either when, or before, the device is first used, the whole damper is under the pressure of the pressurised gas and is ready for use.

It is however to be understood that in each of the above-described embodiments, the cartridge can be replaced whenever necessary.

I claim:

1. A piston and cylinder damping device in which a damping piston secured on a piston rod can be displaced in a cylinder containing damping fluid so as to divide said cylinder into two chambers of varying volume, and wherein the cylinder is provided with a compensating chamber for the fluid displaced by the piston rod, said compensating chamber containing pressurised gas, and being disposed in that end of the cylinder opposite to that through which the piston rod extends, characterised in that the compensating chamber is formed as a cartridge which has at one end a sealing disc, and in that there is provided in said device adjacent to the sealing disc a punch which is arranged to pierce said sealing disc when said piston is first displaced relatively to the cylinder by relative inward movement of said piston rod.

2. A damping device as claimed in claim 1, characterised in that the cartridge also contains damping fluid.

3. A damping device as claimed in claim 1, characterised in that said sealing disc of said cartridge has radial stiffening ribs as well as a centrally disposed piercing area.

4. A damping device as claimed in claim 1, characterised in that said sealing disc of the cartridge is axially located between a seal and a circlip.

5. A damping device as claimed in claim 1, characterised in that the end of the piston rod disposed within the cylinder is provided with said punch.

6. A damping device as claimed in claim 1, characterised in that the cartridge has an external diameter which is smaller than the internal diameter of said cylinder.

7. A damping device as claimed in claim 6, characterised in that said punch is provided on the interior surface of that end of said cylinder adjacent to said cartridge.

8. A damping device as claimed in claim 2, characterised in that said cartridge is provided internally with an axially movable piston.

9. A damping device as claimed in claim 8 characterised in that said cartridge is also provided internally with a valve plate having valves for controlling the flow of fluid into and out of the cartridge.

10. A damping device as claimed in claim 1, characterised in that said cartridge has a larger external diameter than the external diameter of said cylinder and is provided with a counter-bore whereby the cartridge can be fitted over one end of said cylinder.

11. A damping device as claimed in claim 10, characterised in that the cartridge is welded to the cylinder wall.

* * * * *